United States Patent Office 2,696,496
Patented Dec. 7, 1954

2,696,496
S-CROTONYL ALKYLXANTHATES

W E Craig, Chien-Pen Lo, and Elwood Y. Shropshire, Philadelphia, Pa., assignors to Rohm & Haas Company, Philadelphia, Pa., a corporation of Delaware No Drawing. Application July 5, 1952,
Serial No. 297,412

6 Claims. (Cl. 260—455)

This invention deals with xanthates of the formula $$ROC-S-COCH=CHCH_3$$
$$\parallel$$
$$S$$

wherein R is an aliphatic saturated hydrocarbon group of not over four carbon atoms. Unlike some other S-acyl alkylxanthates, the above S-crotonyl derivatives are relatively stable. They are effective fungicides, being particularly active against *Sclerotinia fructicola* and like fungi. They are oil-soluble and can be mixed with other fungicidal and insecticidal agents in solvent systems including emulsifiable concentrates.

These compounds are prepared by reacting a soluble salt of an aliphatic hydrocarbon substituted xanthic acid which may be represented by the formula $$ROCSM$$
$$\parallel$$
$$S$$

where M is an anion, particularly an alkali metal anion, such as sodium or potassium, and a crotonyl halide, $$CH_3CH=CHCOX$$

where X is chlorine or bromine. The reaction is best carried out in the presence of an inert organic solvent such as naphtha, carbon bisulfide, benzene, toluene, ethyl ether, isopropyl ether, dioxane, or the like. A reaction temperature between about 20° and 80° C. may be used, a temperature between 20° and 40° C. being preferred. The reaction mixture is washed with water and the solvent solution is concentrated, under reduced pressure if necessary, to yield the desired reaction product as an oil.

As the salt in this reaction, there may be used sodium or potassium methylxanthate, ethylxanthate, propylxanthate, isopropylxanthate, butylxanthate, and the like.

Typical preparations are described in the following illustrative examples, parts being by weight.

Example 1

A suspension was made of 75 parts of potassium methylxanthate in 75 parts of petroleum ether. Thereto at a temperature of about 30° C. there was added crotonyl chloride in an amount of 75 parts. The resulting mixture was stirred for two hours. Water was then added in an amount of 200 parts, stirred with the mixture, and then allowed to form an aqueous layer which was drawn off. The organic layer was again washed with water, separated, and dried over calcium chloride. The dried liquid was heated on a steam bath under reduced pressure. There was obtained as a residue a yellow oil in an amount of 58.5 parts. This was S-crotonyl methylxanthate, which by sulfur analysis was 96% pure.

At a dilution of 5 parts per million this compound inhibited the germination of spores of *Sclerotinia fructicola* in standard fungitoxicity tests.

In the same way sodium ethylxanthate is reacted with crotonyl chloride or crotonyl bromide to give S-crotonyl ethylxanthate, an effective fungicidal agent.

Example 2

By the above procedure there were mixed 30.2 parts of crotonyl chloride and a suspension of 55 parts of potassium n-butylxanthate in 100 parts of carbon bisulfide. This mixture was stirred for two hours and washed with water several times. From the dried organic layer there was obtained 53 parts of S-crotonyl n-butylxanthate as an amber oil.

This compound was effective at 5 parts per million in inhibiting germination of spores of *Sclerotinia fructicola*.

Example 3

There were mixed 36.9 parts of crotonyl chloride and a suspension of 75 parts of potassium isobutylxanthate in 100 parts of carbon bisulfide. The mixture was stirred for an hour, washed with water, and worked up as 'above. There was obtained a brown oil amounting to 53 parts and corresponding in composition to S-crotonyl isobutylxanthate.

This compound was also effective at 5 parts per million in inhibiting the germination of spores of *Sclerotinia fructicola*.

In the same way there may be prepared S-crotonyl sec.-butylxanthate or S-crotonyl propylxanthate. These are also effective fungicidal agents.

Example 4

In the same way there were mixed 30 parts of crotonyl chloride and a suspension of 65 parts of potassium allylxanthate in 100 parts of benzene. The mixture was stirred for an hour and worked up as above. The product obtained was a yellow oil corresponding in composition to S-crotonyl allylxanthate, being 97.5% pure.

Rather surprisingly this compound and the corresponding methallyl homologue are relatively poorly effective in preventing germination of spores of *Sclerotinia fructicola*.

In the same way other sodium or potassium alkylxanthates may be reacted with crotonyl chloride or bromide to give S-crotonyl derivatives as above. With alkyl substituents of not over four carbon atoms the S-crotonyl alkylxanthates are potent fungicides.

We claim:

1. As a chemical substance, compounds of the formula $$ROC-S-COCH=CHCH_3$$
$$\parallel$$
$$S$$

where R is an alkyl group of not over four carbon atoms.
2. As a chemical compound, S-crotonyl methylxanthate.
3. As a chemical compound, S-crotonyl ethylxanthate.
4. As a chemical compound, S-crotonyl propylxanthate.
5. As a chemical compound, S-crotonyl n-butylxanthate.
6. As a chemical compound, S-crotonyl isobutylxanthate.

References Cited in the file of this patent
UNITED STATES PATENTS

| Number | Name | Date |
|---|---|---|
| 1,684,536 | Fischer | Sept. 18, 1928 |
| 1,943,758 | Douglass | Jan. 16, 1934 |
| 2,380,401 | Browning | July 31, 1945 |
| 2,588,969 | Dickey et al. | Mar. 11, 1952 |

OTHER REFERENCES

Brown, "Insect Control by Chemicals" (1951), page 88.